(12) United States Patent
Qutub et al.

(10) Patent No.: US 8,190,686 B2
(45) Date of Patent: May 29, 2012

(54) SPAM FILTERING FOR MOBILE COMMUNICATION DEVICES

(75) Inventors: S. Shehryar Qutub, Hoffman Estates, IL (US); Alok Sharma, Lisle, IL (US)

(73) Assignee: Alcatel Lucent, Paris (FR)

(*) Notice: Subject to any disclaimer, the term of this patent is extended or adjusted under 35 U.S.C. 154(b) by 944 days.

(21) Appl. No.: 10/920,005

(22) Filed: Aug. 17, 2004

(65) Prior Publication Data

US 2006/0041622 A1 Feb. 23, 2006

(51) Int. Cl.
*G06F 15/16* (2006.01)
(52) U.S. Cl. .................. 709/206; 709/207; 709/224
(58) Field of Classification Search .................. 709/206, 709/207, 224
See application file for complete search history.

(56) References Cited

U.S. PATENT DOCUMENTS

| | | | | |
|---|---|---|---|---|
| 5,999,932 | A * | 12/1999 | Paul | 1/1 |
| 6,460,050 | B1 * | 10/2002 | Pace et al. | 707/104.1 |
| 6,654,787 | B1 * | 11/2003 | Aronson et al. | 709/206 |
| 6,779,021 | B1 * | 8/2004 | Bates et al. | 709/206 |
| 6,819,932 | B2 * | 11/2004 | Allison et al. | 455/466 |
| 2003/0149726 | A1 * | 8/2003 | Spear | 709/206 |
| 2003/0204568 | A1 * | 10/2003 | Bhargava et al. | 709/206 |
| 2005/0114533 | A1 * | 5/2005 | Hullfish et al. | 709/230 |
| 2005/0171954 | A1 * | 8/2005 | Hull et al. | 707/10 |
| 2006/0053203 | A1 * | 3/2006 | Mijatovic | 709/206 |
| 2006/0168035 | A1 * | 7/2006 | Cai et al. | 709/206 |

FOREIGN PATENT DOCUMENTS

| | | |
|---|---|---|
| JP | 2003244240 A | 8/2003 |
| WO | WO 03/071753 | 8/2003 |
| WO | WO 2004/008701 | 1/2004 |

* cited by examiner

*Primary Examiner* — Mohamed Ibrahim
(74) *Attorney, Agent, or Firm* — S. R. Santema

(57) ABSTRACT

A spam filtering system and method are disclosed for filtering spam destined for a mobile communication device. In the spam filtering system, a processing system receives a message destined for a mobile communication device through an interface. The processing system processes the message based on first filtering criteria to make an initial determination whether the message is suspected of comprising spam. If the processing system determines that the message is not suspected of comprising spam, then the processing system transmits the message to a message center. If the processing system determines that the message is suspected of comprising spam, then the processing system processes the message based on second filtering criteria to make a final determination whether the message comprises spam. If the processing system determines that the message does comprise spam, then the processing system blocks the message.

15 Claims, 4 Drawing Sheets

SPAM FILTERING FOR MOBILE COMMUNICATION DEVICES

BACKGROUND OF THE INVENTION

1. Field of the Invention

The invention is related to the field of wireless networks, and in particular, to systems and methods of filtering spam destined for mobile communication devices communicating with a wireless network.

2. Statement of the Problem

Many people use computers daily at work or at home to access email accounts. One problem facing computer users is receiving spam in their email accounts. Spam is typically understood to be unsolicited emails or junk emails. From the sender's point-of-view, spam is a form of bulk email, often to a list obtained by companies that specialize in creating email distribution lists. To the receiver, spam is junk email that needs to be deleted and is a risk of including a virus. Spam is roughly equivalent to unsolicited telephone marketing calls except that the user unfortunately pays for part of the spam since everyone shares the cost of maintaining the Internet.

To protect against spam, some users install a spam filter on their computer or network server. A spam filter is a program that is used to detect unsolicited and unwanted emails and prevents those emails from getting to a user's inbox. Like other types of filtering programs, a spam filter looks for certain criteria on which it bases judgments. For example, the simplest and earliest versions can be set to watch for particular words in the subject line of messages and to exclude these from the user's inbox. This method is not especially effective as legitimate messages may be blocked while actual spam is let through. More sophisticated programs attempt to identify spam through suspicious word patterns or word frequency.

Cell phones and other mobile communication devices are now equipped to transmit and receive text messages, such as Short Message Service (SMS) messages. Some cell phones are also equipped to transmit and receive multi-media messages, such as digital pictures taken by a camera phone. Unfortunately, current spam filters used on computers have not been effectively implemented to protect cell phones and other mobile communication devices from receiving spam in the form of SMS and similar-type messages. The current spam filters for computers are tailored for HTTP messages, not text or multi-media messages used by current cell phones.

For a typical SMS text message, the sender enters a number of the destination phone and a text message. The sender's phone transmits signaling (e.g., SS7, C7, or other signaling) over a signaling path through a signaling gateway to an SMS Center (SMSC). If a bearer path is established to the SMSC, the sender's phone transmits the text message to the SMSC over the bearer path. The SMSC can later forward the text message to the destination phone. Unfortunately, if the SMS message comprises spam, there is currently no effective way to block the spam. If the SMS message comprises spam and the SMS message reaches the SMSC, the SMSC will currently transmit the SMS message to the destination phone without checking to see if the SMS message comprises spam.

The user of the destination phone may become dissatisfied with his/her service provider if the user receives too much spam. Thus, it is a problem that facilities do not exist that block spam SMS messages (and other text or multi-media messages that comprise spam) destined for a cell phone or similar mobile communication device.

SUMMARY OF THE SOLUTION

The invention solves the above and other related problems by filtering spam destined for a mobile communication device. By filtering spam before it reaches a mobile communication device, the user of the mobile communication device will not have to read and/or delete the unwanted messages. Service providers implementing the spam filter can advantageously avoid their customers becoming dissatisfied by too much spam.

One embodiment of the invention comprises a spam filtering system. The spam filtering system may be located in a Short Message Service Center (SMSC), a Signaling Transfer Point (STP), an SS7 gateway, an SMPP gateway, or other locations in a wireless network. The spam filtering system includes an interface and a processing system. In operation, the processing system receives a message destined for a mobile communication device through the interface. The processing system processes the message based on first filtering criteria to make an initial determination whether the message is suspected of comprising spam. If the processing system determines that the message is not suspected of comprising spam, then the processing system transmits the message to a message center or another system configured to forward the message to the destination mobile communication device. If the processing system determines that the message is suspected of comprising spam, then the processing system processes the message based on second filtering criteria to make a final determination whether the message comprises spam.

If the processing system determines in the final determination that the message does not comprise spam, then the processing system transmits the message to the message center. If the processing system determines that the message does comprise spam, then the processing system blocks the message.

To improve the performance of the spam filtering system in some embodiments, the processing system stores messages identified to be spam in a data table. The processing system then analyzes the content of the spam messages stored in the data table to identify new spam patterns or other indicators of spam. The processing system may seek the advice of human operators in identifying the new spam patterns. The processing system then updates the first filtering criteria and/or the second filtering criteria using the new spam patterns to improve spam filtering.

The invention may include other exemplary embodiments described below.

DESCRIPTION OF THE DRAWINGS

The same reference number represents the same element on all drawings.

DETAILED DESCRIPTION OF THE INVENTION

FIGS. 1-4 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
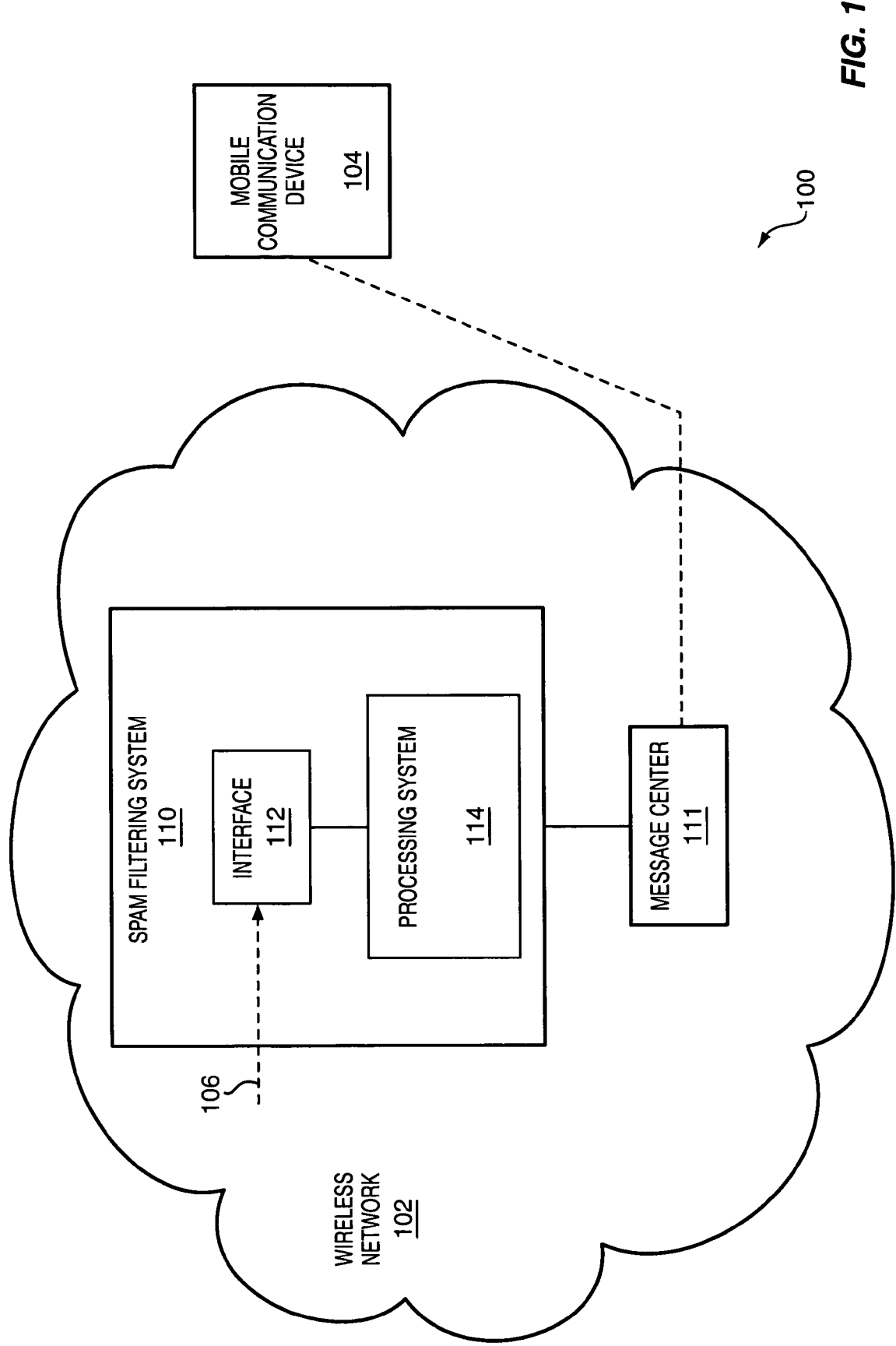
FIG. 1 illustrates a communication environment in an exemplary embodiment of the invention.

FIG. 1 illustrates a communication environment 100 in an exemplary embodiment of the invention. Communication environment 100 includes a wireless network 102 and a mobile communication device 104. Wireless network 102 comprises any network that communicates with end users via wireless signals, such as networks provided by Verizon, Sprint, Cingular, etc. Mobile communication device 104 comprises any device, phone, PDA, etc, that is portable or otherwise mobile and transmits and receives messages via wireless signals. A message comprises any information unit transmitted or received by a cell phone, PDA, or similar device via wireless signals. A message in this embodiment includes a text message, such as an SMS message, and a multi-media message, such as a digital picture from a camera phone. A message in this embodiment is not intended to include HTTP-type messages. Communication environment 100 may include other networks, systems, or devices not shown for the sake of brevity.

Wireless network 102 includes a spam filtering system 110 and a message center 111. Spam filtering system 110 includes an interface 112 and a processing system 114. An interface comprises any systems, devices, or components that receive and transmit messages. A processing system comprises any computer microprocessor, logic circuit, or other processing device that executes instructions. Spam filtering system 110 may be positioned in multiple desired locations in wireless network 102. For instance, spam filtering system 110 may be located in message center 111, a Signaling Transfer Point (STP) (not shown), an SS7 gateway (not shown), an SMPP gateway (not shown), or other locations in wireless network 102. Spam filtering system 110 may include other systems, devices, or components not shown for the sake of brevity. A message center comprises any system that receives a message and forwards the message to a destination mobile communication device. One example of a message center is an SMSC.

Figure 2:
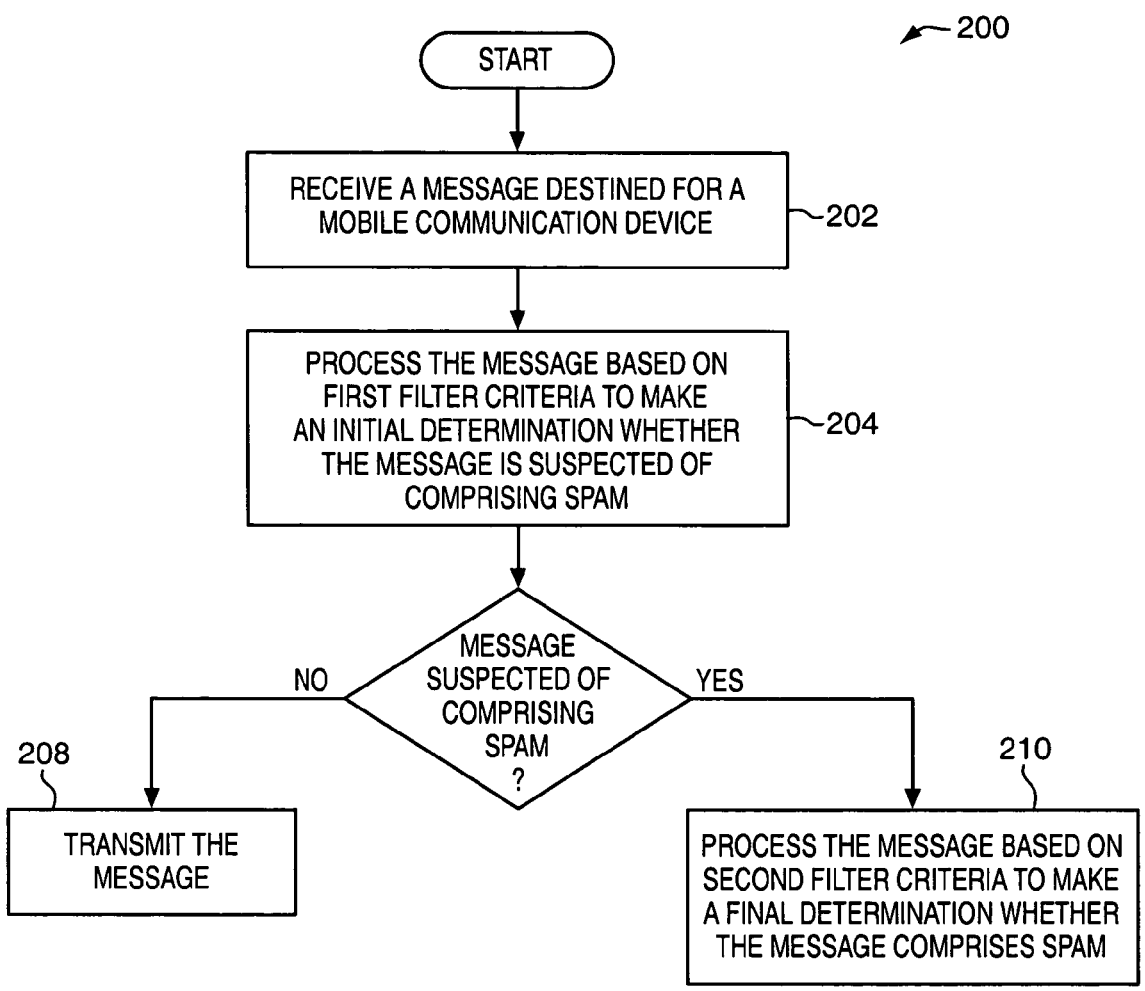
FIG. 2 is a flow chart illustrating a method of filtering spam in a wireless network in an exemplary embodiment of the invention.

FIG. 2 is a flow chart illustrating a method 200 of filtering spam in wireless network 102 in an exemplary embodiment of the invention. Method 200 is described as if performed by spam filtering system 110 in FIG. 1. Processing system 114 receives a message 106 destined for mobile communication device 104 in step 202 (see FIG. 2). Processing system 114 receives the message 106 through interface 112. Message 106 may be transmitted by a mobile phone, a PDA, or any other system configured to send a message 106.

In step 204, processing system 114 processes the message 106 based on first filtering criteria to make an initial determination whether the message 106 is suspected of comprising spam. Spam comprises any unsolicited messages or junk messages. Filtering criteria comprises any rules, algorithms, data, or information used to identify spam. In some embodiments, the initial determination is intended to be a cursory check of the message 106 to identify suspect messages (i.e., messages suspected to be spam). The initial determination is as close to real-time as possible.

If processing system 114 determines that the message 106 is not suspected of comprising spam, then processing system 114 transmits the message to message center 111 in step 208. Processing system 114 may transmit the message 106 to message center 111 through interface 112. Message center 111 can then forward the message 106 to destination mobile communication device 104.

If processing system 114 determines that the message 106 is suspected of comprising spam, then processing system 114 processes the message based on second filtering criteria to make a final determination whether the message comprises spam in step 210. In some embodiments, the final determination is intended to be a more thorough check of the message 106 to determine if the message 106 comprises spam. Time is not as much of an issue in the final determination. Processing system 114 may seek the assistance or query human operators to make the final determination. Method 200 may include further steps not shown in FIG. 2.

Figure 3:
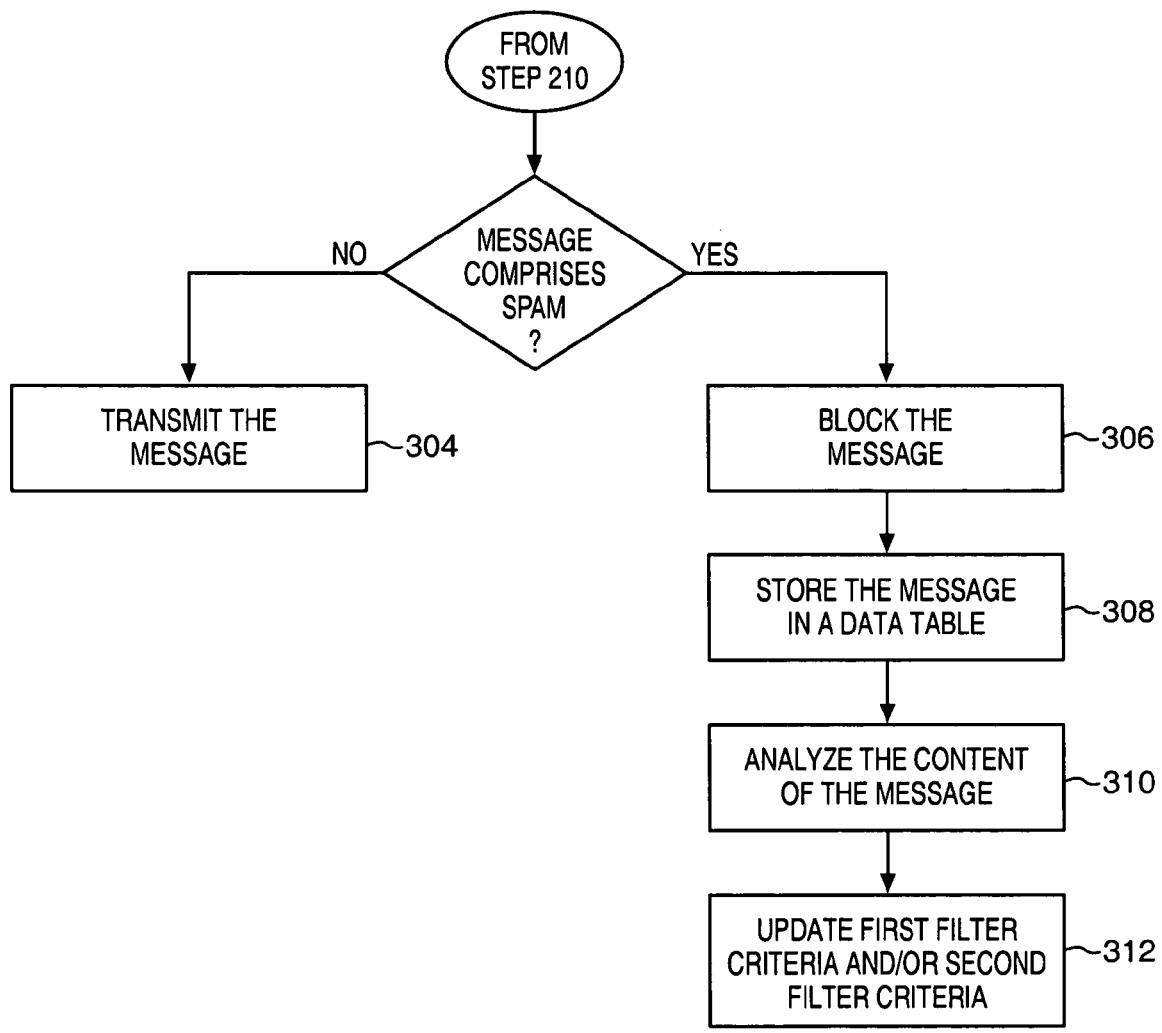
FIG. 3 is a flow chart illustrating additional steps to the method in FIG. 2 in an exemplary embodiment of the invention.

FIG. 3 is a flow chart illustrating additional steps to method 200 in an exemplary embodiment of the invention. In one embodiment, if processing system 114 determines in the final determination in step 210 that the message 106 does not comprise spam, then processing system 114 transmits the message to message center 111 in step 304. Processing system 114 may transmit the message 106 to message center 111 through interface 112. Message center 111 can then forward the message 106 to destination mobile communication device 104.

If processing system 114 determines that the message 106 does comprise spam, then processing system 114 blocks the message 106 in step 306. Processing system 114 stores the message 106 (and potentially previous and subsequent messages) in a data table (not shown) in step 308. Processing system 114 analyzes the content of message 106 and other messages stored in the data table in step 310 to identify new spam patterns or other indicators of spam. Processing system 114 then updates the first filtering criteria and/or the second filtering criteria in step 312. Processing system 114 continually tries to improve the first filtering criteria so that the initial determination will more accurately identify suspect spam messages. Processing system 114 also continually tries to improve the second filtering criteria so that the actual spam is distinguished from genuine messages.

Figure 4:
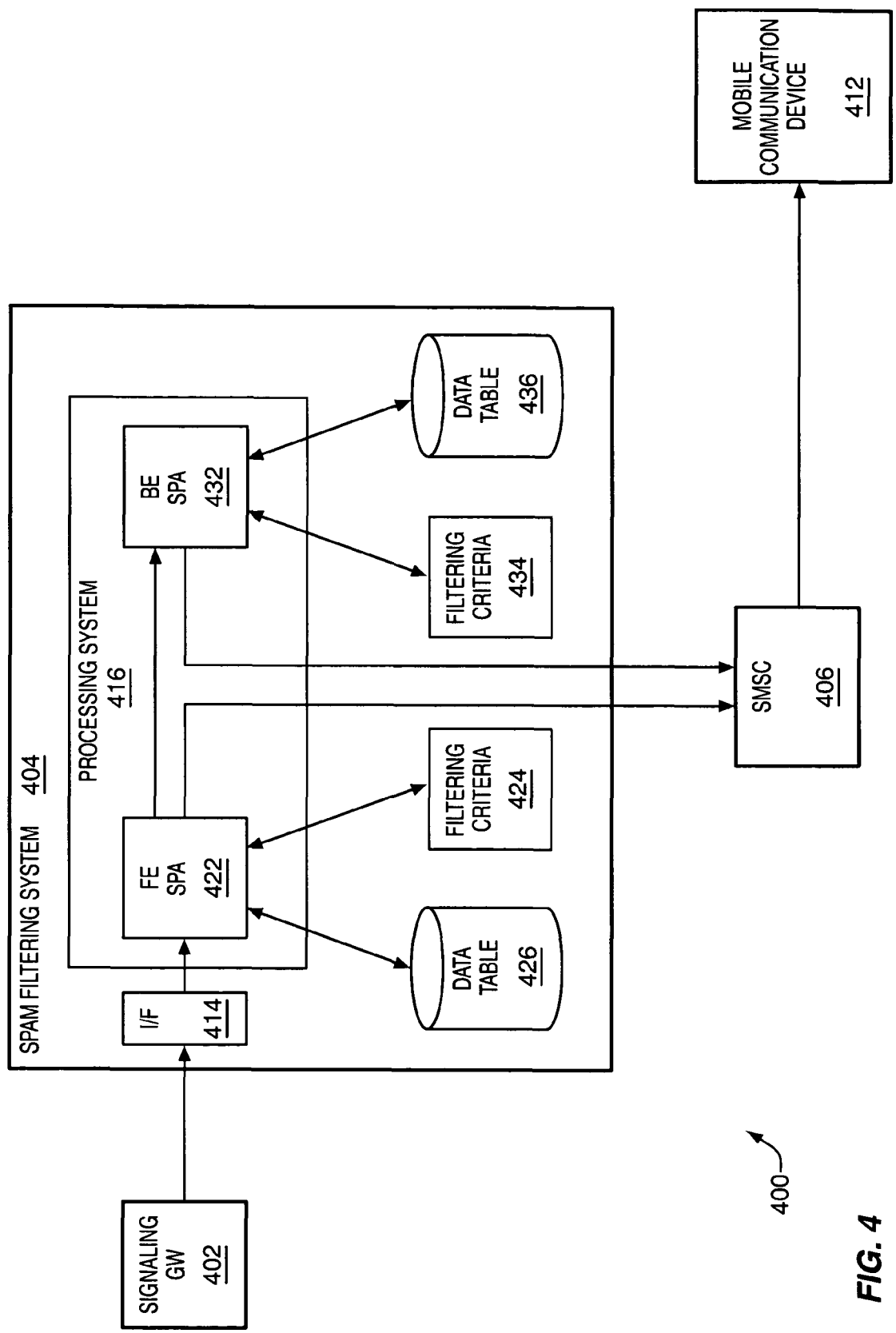
FIG. 4 is a communication environment in another exemplary embodiment of the invention.

FIG. 4 is a communication environment 400 in another exemplary embodiment of the invention. Communication environment 400 includes signaling gateway 402, spam filtering system 404, Short Message Service Center (SMSC) 406, and mobile communication device 412. Signaling gateway 402 may comprise an SS7 gateway, an Internet Protocol (IP) gateway, a C7 gateway, or any other signaling gateway. Spam filtering system 404 includes an interface 414 and a processing system 416. Processing system 416 is configured to execute front-end service package application (FE-SPA) 422 and back-end service package application (BE-SPA) 432. FE-SPA 422 when executed by processing system 416 is able to access filtering criteria 424 and data table 426. BE-SPA 432 when executed by processing system 416 is able to access filtering criteria 434 and data table 436. SMSC 406 comprises any facility that accepts, buffers, processes and distributes short messages (up to 128 bytes). An SMSC is used in this embodiment, but a Multi-Media Service Center (MMSC) could be used in other embodiments that accepts, buffers, processes and distributes multi-media messages, such as digital pictures.

Spam filtering system 404 is located between signaling gateway 402 and SMSC 406 in this embodiment. Spam filtering system 404 could be located in other desired locations. In other embodiments, spam filtering system 404 could be located in signaling gateway 402, in SMSC 406, in other systems, or may be a stand-alone system. Spam filtering system 404 is a network-based system. Spam filtering system 404 is intended to intercept spam in the wireless network before the spam reaches a communication device, such as a cell phone. Spam filtering system 404 advantageously does not need to be resident on the communication device, thus avoiding issues such as processor speed and memory size. This is opposed to many current spam filters that are resident on computers and protect individual computers from spam.

When in operation, signaling gateway 402 receives an SMS message. In other embodiments, the message may comprise a Multi-Media Service (MMS) message. The SMS message includes signaling and a data stream. Based on the address for the destination mobile communication device 412 (e.g., a phone number for communication device 412), signaling gateway 402 attempts to transmit the SMS message to SMSC 406. Spam filtering system 404 intercepts the SMS message transmitted to SMSC 406. Signaling gateway 402 may not know the existence of spam filtering system 404, or may transmit the SMS message to spam filtering system 404.

FE-SPA 422 receives the SMS message. FE-SPA 422 processes the SMS message to make an initial determination whether the SMS message is suspected of comprising spam. FE-SPA 422 accesses the filtering criteria 424 to process SMS message. The initial determination is a cursory check of the SMS message to identify suspect messages (i.e., messages suspected to be spam). The initial determination is performed as close to real-time as possible.

The following describes some of the filtering criteria 424 used to make the initial determination. FE-SPA 422 may process the sending address (e.g., the sender's phone number) of the SMS message and determine if a large number of SMS messages originated from this sending address. FE-SPA 422 may process the receiving address to determine if the receiving address is adjacent to or is sequential to addresses of other SMS messages previously sent. FE-SPA 422 may track the number of SMS messages sent from the sending address to determine if the sending address exceeds a message counter threshold. FE-SPA 422 may determine if the sending address is on a white list (approved list), such as a legitimate bulk SMS sender, or determine if the sending address is on a black list (non-approved list), such as a sender identified to send spam. The white and black lists may be selected by network analysts and/or selected by the user for his/her preferences. FE-SPA 422 may process the data stream of the SMS message to identify certain data patterns determined to comprise spam.

If FE-SPA 422 does not suspect the SMS message to comprise spam based on the initial determination, then FE-SPA 422 forwards the SMS message to SMSC 406. SMSC 406 then forwards the SMS message to mobile communication device 412. Mobile communication device 412 may comprise a wireless phone, a PDA, a pager, or similar communication device.

If FE-SPA 422 suspects that the SMS message comprises spam based on the initial determination, then FE-SPA 422 assigns a suspect level to the SMS message. The suspect level indicates how sure FE-SPA 422 is that the SMS message comprises spam. The suspect level may be based on the Bayesian metric. FE-SPA 422 then forwards the SMS message to BE-SPA 432 for a more thorough analysis.

FE-SPA 422 uses data table 426 to track information on the SMS messages it processes. For instance, FE-SPA 422 may track the number of SMS messages sent by a particular sending address over a time period in data table 426. FE-SPA 422 may also track the number of SMS messages sent by a particular network over a time period in data table 426.

BE-SPA 432 receives the suspect SMS message from FE-SPA 422. BE-SPA 432 processes the SMS message to make a final determination whether the SMS message comprises spam. BE-SPA 432 accesses the filtering criteria 434 to process the SMS message and make the final determination. Filtering criteria 434 may be the same as filtering criteria 424. However, filtering criteria 434 typically provides for a more in-depth examination of the SMS message than filtering criteria 424, so filtering criteria 434 may include more rules or content data patterns than filtering criteria 424. For instance, filtering criteria 424 may allow FE-SPA 422 to check signaling information for the SMS message and check small content segments of the data stream of the SMS message. On the other hand, filtering criteria 434 may allow BE-SPA 432 to thoroughly check the content of the data stream of the SMS message to look for content patterns identified to be spam. A thorough check of the data stream in FE-SPA 422 may be too time consuming. BE-SPA 432 can use virtually any filtering criteria 434 to examine the SMS message because time is not as much of an issue.

If BE-SPA 432 determines that the SMS message does not comprise spam, then BE-SPA 432 forwards the SMS message to SMSC 406. SMSC 406 then forwards the SMS message to mobile communication device 412.

If BE-SPA 432 determines that the SMS message comprises spam, then BE-SPA 432 blocks the SMS message from reaching SMSC 406. BE-SPA 432 also stores the SMS message determined to be spam in data table 436 for further analysis. BE-SPA 432, possibly under the guidance of human operators, analyzes the spam SMS messages stored in data table 436 to identify new spam patterns. If a new spam pattern is found, then BE-SPA 432 updates filtering criteria 424 used by FE-SPA 422. BE-SPA 432 continually updates filtering criteria 424 to improve the performance of FE-SPA 422 in identifying suspect SMS messages. BE-SPA 432 also updates filtering criteria 434. The updating of filtering criteria 424 and filtering criteria 434 may be under the guidance of human operators to ensure quality.

In summary, spam filtering system 404 advantageously does an initial spam determination so that legitimate SMS messages reach SMSC 406 in substantially real-time. Spam filtering system 404 then performs a more detailed analysis on suspect messages to effectively block spam SMS messages before the SMS messages reach SMSC 406. By blocking most or all of the spam SMS messages, mobile communication device 412 receives less spam.

We claim:

1. A spam filtering system for a wireless network, the spam filtering system comprising:
   an interface implemented between a sender of an SMS message and an SMS center that receives a SMS message destined for a mobile communication device;
   a processing system having a first processing stage that receives the SMS message from the interface;
   said processing system including said first processing stage that performs a cursory check of the SMS message based on first filtering criteria to make an initial determination whether the SMS message is suspected of comprising spam;
   said first processing stage being further adapted to transmit the SMS message to the SMS center responsive to an initial determination by said first processing stage that the SMS message is not suspected of comprising spam;
   said first processing stage forwards the SMS message to a second processing stage to make a final determination whether the SMS message comprises spam, said final determination based on second filtering criteria and comprising a more thorough check of the SMS message relative to the first processing stage responsive to the initial determination by said first processing stage that the SMS message is suspected of comprising spam;
   responsive to a final determination by the second processing stage that the SMS message does not comprise spam, said second processing stage being adapted to transmit the SMS message to the SMS center; and responsive to a final determination by the second processing stage that the SMS message comprises spam, said second processing stage being adapted to block the SMS message and automatically update at least one of the first filtering criteria and the second filtering criteria.

2. The spam filtering system of claim 1 wherein: the first processing stage and a first data table execute a front-end service package application of said first processing stage to process the SMS message based on the first filtering criteria to make the initial determination.

3. The spam filtering system of claim 2 wherein:

said processing system analyzes the content of the SMS message for new spam patterns; and updates at least one of the first filtering criteria and the second filtering criteria to store data based on the new spam patterns.

4. The spam filtering system of claim 1 wherein the processing system is further adapted to store the SMS message in each processing stage responsive to a determination by said first and second processing stages that the SMS message comprises spam.

5. The spam filtering system of claim 1 wherein the processing system executes a front-end service package application to process the SMS message based on the first filtering criteria to make the initial determination, and executes a back-end service package application to process the message based on the second filtering criteria to make the final determination.

6. The spam filtering system of claim 1 wherein: the processing system queries human operators to make the final determination.

7. The spam filtering system of claim 1 wherein: the first processing stage of said processing system processes the SMS message in real-time based on the first filtering criteria to make the initial determination.

8. The spam filtering system of claim 1 wherein: the processing system assigns a suspect level to the SMS message responsive to the initial determination by said first processing stage that the SMS message is suspected of comprising spam.

9. A method of operating a processing system to filter spam in a wireless network, said system having an interface implemented between a sender of a SMS message and an SMS center that receives an SMS message, the method comprising the steps of:

receiving an SMS message destined for a mobile communication device;

operating a first processing stage of said processing system to perform a cursory check of the SMS message based on first filtering criteria to make an initial determination whether the SMS message is suspected of comprising spam;

operating said first processing stage to transmit the received SMS message to a SMS center responsive to a determination by said first processing stage that the SMS message is not suspected of comprising spam;

forwarding the received SMS message to a second processing stage of said processing system to perform a more thorough check of the SMS message relative to the first processing stage responsive to the initial determination by said first processing stage that the SMS message is suspected of comprising spam;

said second processing stage makes a final determination based on second filtering criteria whether the SMS message comprises spam;

operating said second processing stage to transmit the SMS message to the SMS center responsive to a final determination by said second processing stage that the SMS message does not comprise spam; and operating said second processing stage to block the received SMS message and automatically update at least one of the first filtering criteria and the second filtering criteria responsive to the final determination that the received SMS message comprises spam.

10. The method of claim 9 further comprising the step of:

storing the SMS message in a separate data tables of the first and second processing stages responsive to the final determination determining that the SMS message comprises spam.

11. The method of claim 10 wherein the steps of analyzing the SMS message and updating at least one of the first filtering criteria and the second filtering criteria comprises:

analyzing the content of the SMS message for new spam patterns, and operating one of said first and second processing stages to update at least one of the first filtering criteria and the second filtering criteria based on new spam patterns.

12. The method of claim 9 further comprising the steps of:

operating said first processing stage to execute a front-end service package application to process the SMS message based on the first filtering criteria to make the initial determination, and operating second processing stage to execute a back-end service package application to process the SMS message based on the second filtering criteria to make the final determination.

13. The method of claim 9 further comprising the step of: querying human operators to make the final determination.

14. The method of claim 9 wherein the step of operating said first processing stage to process the SMS message based on first filtering criteria to make an initial determination comprises:

processing the SMS message in real-time based on the first filtering criteria to make the initial determination.

15. The method of claim 9 wherein the step of operating said first and second processing stages to process the SMS message based on first filtering criteria to make an initial determination comprises:

assigning a suspect level to the SMS message responsive to the initial determination determining that the SMS message is suspected of comprising spam.

* * * * *